United States Patent
Hebrard et al.

(10) Patent No.: US 8,371,828 B2
(45) Date of Patent: Feb. 12, 2013

(54) AIR COMPRESSOR HAVING A CAST ALUMINUM CRANKCASE

(75) Inventors: Gilles Hebrard, Caen (FR); Olivier Herbiet, Lisieux (FR)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 751 days.

(21) Appl. No.: 12/440,401

(22) PCT Filed: Sep. 6, 2007

(86) PCT No.: PCT/EP2007/007796
§ 371 (c)(1),
(2), (4) Date: Nov. 23, 2009

(87) PCT Pub. No.: WO2008/028669
PCT Pub. Date: Mar. 13, 2008

(65) Prior Publication Data
US 2010/0074779 A1    Mar. 25, 2010

(30) Foreign Application Priority Data

Sep. 8, 2006  (DE) .......................... 10 2006 042 828
May 18, 2007  (DE) .......................... 10 2007 023 192

(51) Int. Cl.
F04B 39/02 (2006.01)
F04B 39/06 (2006.01)
(52) U.S. Cl. .............................. 417/366; 417/53; 92/144
(58) Field of Classification Search .................... 417/53, 417/366, 367, 372, 415, 419; 92/144, 169.1
See application file for complete search history.

(56) References Cited

U.S. PATENT DOCUMENTS

| | | | |
|---|---|---|---|
| 3,911,876 A * | 10/1975 | Freyn | 123/41.31 |
| 5,305,818 A | 4/1994 | Darsy et al. | |
| 5,584,675 A * | 12/1996 | Steurer et al. | 417/372 |
| 6,056,521 A | 5/2000 | Leu et al. | |
| 6,227,821 B1 * | 5/2001 | Leu et al. | 417/423.14 |
| 6,443,713 B1 * | 9/2002 | Weiss et al. | 417/413.1 |
| 6,692,240 B1 * | 2/2004 | Leonhard et al. | 417/372 |
| 7,387,102 B2 | 6/2008 | Henkel | |

FOREIGN PATENT DOCUMENTS

| | | |
|---|---|---|
| DE | 197 27 185 C2 | 2/1998 |
| DE | 103 04 971 B4 | 7/2006 |
| EP | 0 470 021 A1 | 2/1992 |
| FR | 2 708 495 A1 | 2/1995 |
| JP | 60-101257 A | 6/1985 |
| WO | WO 2004/048766 A1 | 6/2004 |

OTHER PUBLICATIONS

German Office Action dated May 11, 2009 with English translation (four (4) pages).
International Search Report dated Feb. 6, 2008 w/English translation (four (4) pages).

* cited by examiner

Primary Examiner — Peter J Bertheaud
(74) Attorney, Agent, or Firm — Crowell & Moring LLP (57) ABSTRACT

An air compressor of a pneumatic system in a vehicle includes a piston pump that is fitted with at least one piston and a crankshaft which are located in a crankcase. At least part of the crankcase is cast from aluminum and includes an integrally formed coolant duct.

20 Claims, 6 Drawing Sheets

AIR COMPRESSOR HAVING A CAST ALUMINUM CRANKCASE

BACKGROUND AND SUMMARY OF THE INVENTION

The invention relates to an air compressor of a compressed air system of a vehicle, including a piston pump with pistons, which are guided in working cylinders of a crankcase, and a crankshaft which is guided in the crankcase. At least one part of the crankcase is cast from aluminum. The crankcase includes at least one coolant duct for conducting coolant, which coolant duct is formed by at least one tube which is at least partially integrally cast into the crankcase.

Air compressors for utility vehicles conventionally have a cast steel crankcase which has no coolant ducts. In contrast, the cooling takes place in the cylinder cover, which is placed onto the crankcase, by means of air or liquid depending on the power required from the air compressor. The inlet and outlet valves, the mounting arrangement of the valves and at least one coolant duct and, if appropriate, a heat exchanger, are arranged in the cylinder cover.

With regard to installation in a vehicle, it is desirable for the air compressor to have the lowest possible weight. A generic air compressor is known from EP 0 470 021 A1, with the crankcase being cast from aluminum or from an aluminum alloy, and with the coolant ducts being formed as integrally cast aluminum tubes.

WO 2004/048765 describes a cylinder crankcase which has guide ducts for cooling, which guide ducts are formed by pre-shaped tubes which are concomitantly integrally cast during the casting of the crankcase.

The operating temperature prevailing in the crankcase is a significant factor with regard to the service life of the air compressor.

The invention is, in contrast, based on the object of further developing an air compressor of the above-mentioned type such that the air compressor has a longer service life. The longer service life is to be obtained by an improved cooling. Furthermore, it is intended to specify a method for producing an air compressor having these properties.

According to the invention, the crankcase is cast from aluminum. This results in a significant weight reduction in relation to cast steel crankcases. A weight saving of approximately 40% to 50% is obtained in relation to a crankcase produced from cast steel. The weight of the vehicle carrying the air compressor is, therefore, also advantageously reduced, which has a positive effect on fuel consumption.

Furthermore, the specific thermal conductivity of cast aluminum is approximately sixty times higher than that of cast steel, such that the heat generated during operation can be better dissipated, in particular to coolant which is conducted in at least one coolant duct of the crankcase.

The crankcase also includes at least one duct for conducting coolant. This measure reduces the operating temperature of the air compressor, such that the air compressor has a longer service life. The coolant duct is formed by at least one tube, which is at least partially integrally cast into the crankcase.

According to the invention, to supply coolant to the region of the crankcase between the working cylinders, the tube is bent into a plurality of windings in the shape of a figure "eight". In this way, this region is also cooled, which has an advantageous effect on the service life of the compressor. Here, the bending of the tube into the shape of a Figure eight is a simple measure for supplying coolant to the region.

Advantageous refinements of the invention are described and claimed herein.

If the coolant duct were to open outward at a contact surface with respect to a cylinder cover in order to permit a continuation of the coolant duct through the coolant duct in the cylinder cover so as to provide a common coolant circuit of the crankcase and cylinder cover, this would lead to sealing problems at the contact surface. The coolant duct of the crankcase therefore preferably opens outward at a surface, which is not a contact surface with respect to a cylinder cover, of the crankcase, and may then be connected to the coolant duct of the cylinder cover by way of a separate connection.

For example, that surface, which is not the contact surface with respect to a cylinder cover, of the crankcase at which the coolant duct opens out is formed by an end surface, which is arranged substantially perpendicular to the crankshaft, with a supply pipe and a return pipe of the coolant duct being formed on the end surface.

According to one refinement, it is possible for at least one coolant duct of the crankcase to be integrated in a coolant circuit, which also includes a coolant duct which is assigned to the cylinder cover. The two coolant ducts may be connected in parallel or in series in the coolant circuit.

It is particularly preferable for the coolant duct to be formed by at least one tube which is produced from a non-aluminum material. Such a tube is preferably composed of steel and is cold or hot worked.

The crankcase is particularly preferably split into two crankcase parts at a parting plane which encompasses a central axis of the crankshaft. This firstly results in simple assembly and production of the crankcase.

Secondly, it is possible for a peripherally open oil duct to be formed in a contact surface of one of the crankcase parts, which oil duct connects a crankshaft bearing to at least one further crankshaft bearing for the supply of oil. Furthermore, it is then possible for the peripherally open oil duct to be peripherally closed off by the connection of the two crankcase parts and, on the one crankcase part, to open out at the end side into ports for a supply of oil. A core is therefore used to produce the oil duct during the casting process, which core can be removed in a simple manner after the casting process. The assembly of the one crankcase part on the other crankcase part serves not least to sealingly close off the oil duct at the periphery. The two crankcase parts are, for example, connected to one another by tension rods and centered with respect to one another by centering pins.

It is particularly preferable for all of the crankshaft bearings to be formed on the end side of the crankcase and to be divided by the parting plane.

Optimally, an upper crankcase part is provided with the at least one coolant duct and with the, in each case, upper part of a crankshaft bearing, and has at least one cylinder which guides a piston. In contrast, a lower crankcase part has the at least one oil duct and the, in each case, lower part of a crankshaft bearing.

The method for producing an air compressor having a crankcase into which at least one tube is integrally cast as a coolant duct includes at least the following steps:

a) shaping at least one tube according to at least one section of the coolant duct of the crankcase of the air compressor, b) bending the tube into a plurality of windings in the shape of a Figure eight in order to supply coolant to the region of the crankcase between the working cylinders via the tube, c) placing the at least one tube in a casting mold for at least one crankcase part of the crankcase; and d) casting the at least one part of the crankcase from aluminum such that the at least one tube is at least partially integrally cast into the at least one crankcase part of the crankcase.

This approach has significant advantages in relation to coolant ducts which are integrally cast directly into the crankcase, that is to say by providing corresponding cores. This is because, in such a case, it is necessary when designing the profile of the coolant duct to make allowance for an arrangement of casting cores which is possible from a casting aspect, such that the coolant ducts cannot be designed with regard to the criterion of optimum cooling of the crankcase. In contrast, the method described above makes it possible for the tube to be shaped or bent so as to have an optimum coolant duct profile.

BRIEF DESCRIPTION OF THE DRAWINGS

Exemplary embodiments of the invention are illustrated in the drawing, in which.

DETAILED DESCRIPTION OF THE DRAWINGS

Figure 1:
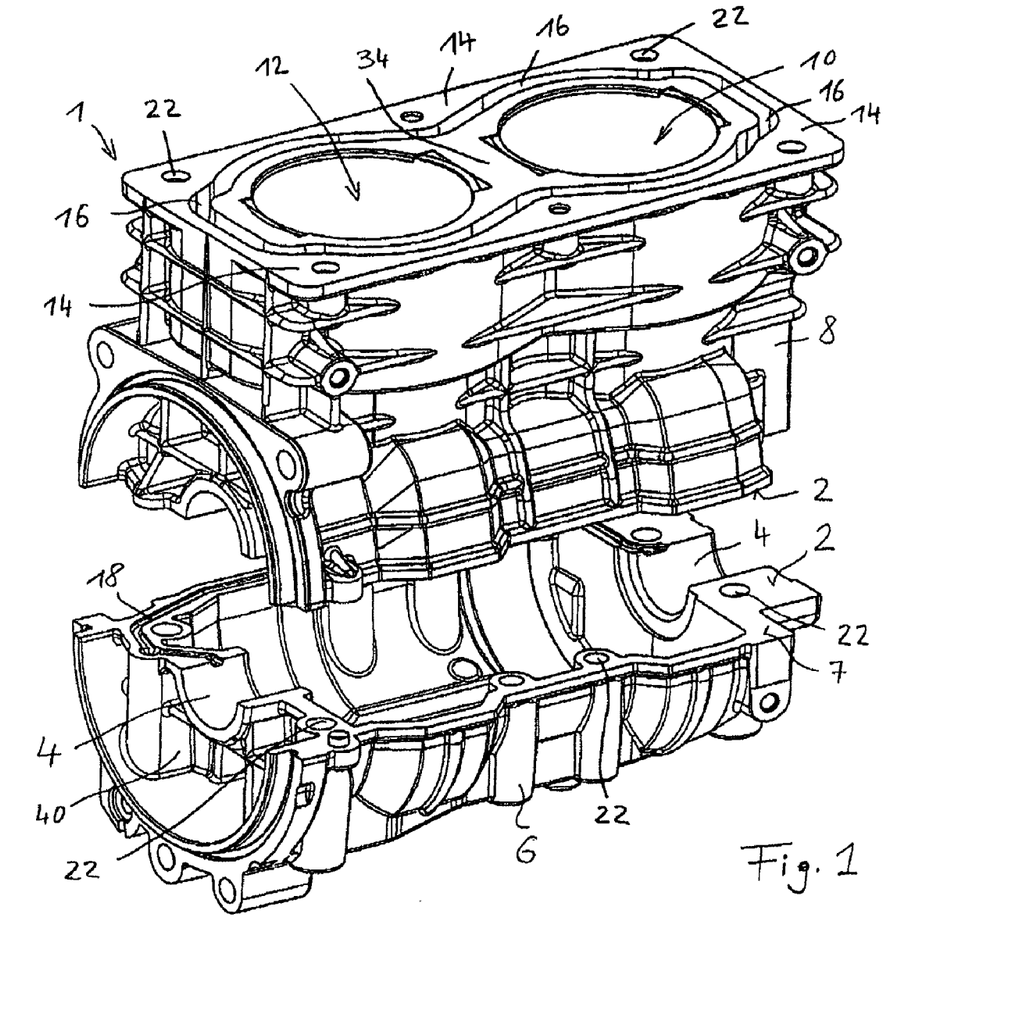
FIG. 1 shows a perspective illustration of a crankcase of an air compressor according to one preferred embodiment of the invention.
Figure 6:
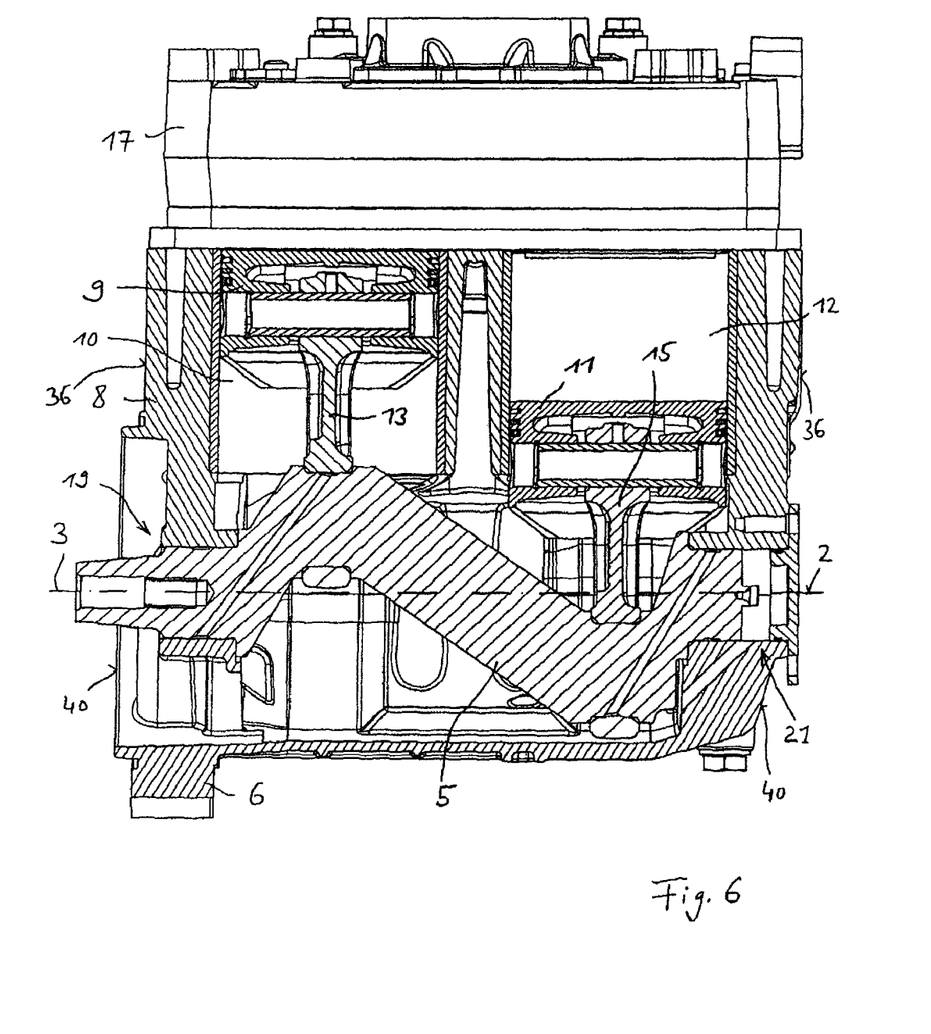
FIG. 6 shows a cross-sectional illustration of an air compressor having a crankcase as per FIG. 1.

FIG. 1 illustrates merely a two-part crankcase 1 of an air compressor according to one preferred exemplary embodiment of the invention. The crankcase 1 is divided along a parting plane 2, which parting plane 2 encompasses a central axis 3 of a crankshaft 5 (illustrated in FIG. 6) which is mounted by means of the crankcase 1 in plain bearing shells 4 and which parting plane 2 is arranged perpendicular to the piston movement. The crankcase 1 has a lower part 6 and an upper part 8 in which for example two working cylinders 10, 12 for guiding two pistons 9, 11 are formed. The pistons 9, 11 interact in a known way with the crankshaft 5 via connecting rods 13, 15. FIG. 6 likewise shows a cylinder cover 17, which is placed onto a planar, upper contact surface 14 of the upper part 8 and which has at least inlet and outlet valves. At least one coolant duct is also formed in the cylinder cover 17.

All of the crankshaft bearings 19, 21 are particularly preferably formed on the crankcase 1. In the present case, two crankshaft bearings 19, 21 are formed in each case as end-side semi-circular openings in the upper part 8 and in the lower part 6 and are divided by the parting plane 2.

According to one preferred embodiment, at least one coolant duct 16 for conducting coolant, for example air or a liquid coolant, is formed in the crankcase 1. The coolant duct 16 is preferably a constituent part of a common coolant circuit, which also includes the coolant duct of the cylinder cover 17.

According to the embodiment of FIG. 1, the coolant duct 16 is formed in the contact surface 14 of the upper part 8 with respect to the cylinder cover 17 and is peripherally open in the direction of they cylinder cover 17, such that the coolant duct 16 is sealingly closed off at the periphery when the cylinder cover 17 is placed on the contact surface. Furthermore, an oil duct 18 is formed in the lower part 6, preferably in a contact surface 7 with respect to the upper part 8.

The upper part 8 and the lower part 6 of the crankcase 1 are cast from aluminum, preferably using a pressure die casting, permanent mold casting or sand casting process. Here, in the embodiment of FIG. 1, the coolant duct 16 is formed by primary forming, that is to say is cast together with the upper part 8 during the casting process by virtue of a corresponding casting core being provided, which casting core is removed after the casting process.

According to further embodiments according to FIGS. 2 through 5, the coolant duct 16 of the crankcase 1 is preferably formed by a tube 24, which is produced from a non-aluminum material and which is, for example, substantially entirely integrally cast into the crankcase 1. The tube 24 is preferably composed of at least one steel tube which is bent according to the desired profile of the coolant duct 16, which is arranged in the upper part 8 of the crankcase 1.

Figure 2:
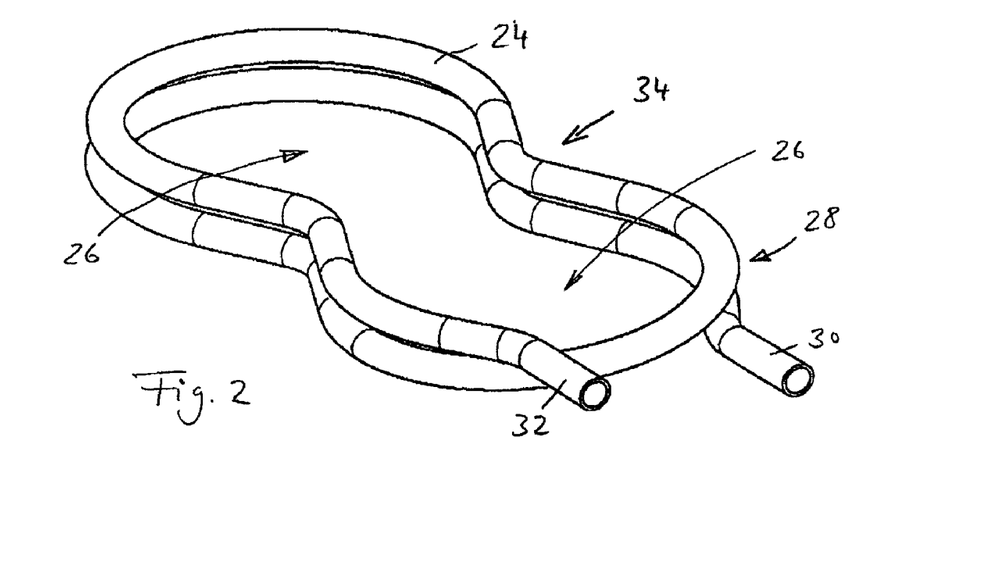
FIG. 2 shows a perspective illustration of a coolant duct, which is wound from steel tube, for a crankcase of an air compressor.

An example of a tube 24 of this type is shown in FIG. 2, with the tube 24 preferably being formed in one piece and having two regions 26 which are molded corresponding to the periphery of the two working cylinders 10, 12. To improve the cooling action it is possible for a plurality of tube windings 28 to be arranged one above the other or adjacent to one another. In the embodiment of FIG. 2, the tube 24 has two windings 28, with the two end pieces 30, 32 of the tube 24 being arranged adjacently in the direct vicinity of one another and forming a supply pipe 30 and a return pipe 32. In this embodiment, no cooling by means of a coolant duct is provided in the region 34 between the two working cylinders 10, 12.

Figure 3:
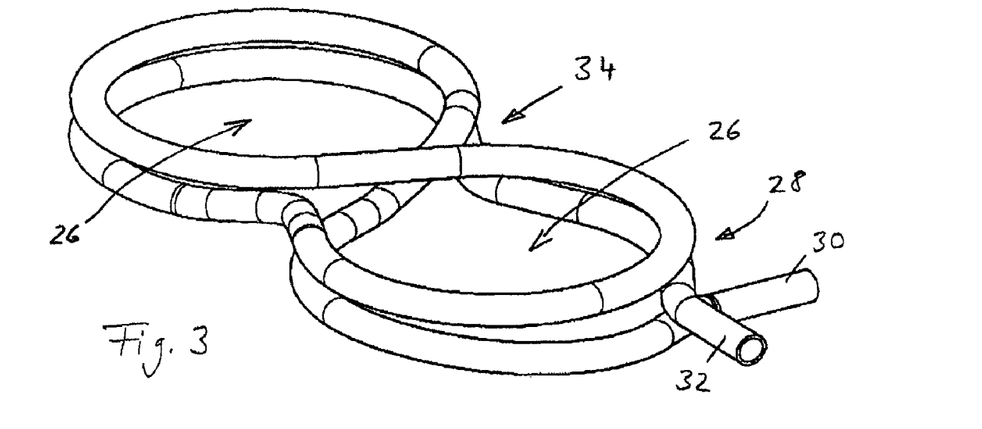
FIG. 3 shows a perspective illustration of a coolant duct, which is wound from steel tube, for a crankcase of an air compressor according to a further embodiment.
Figure 4:
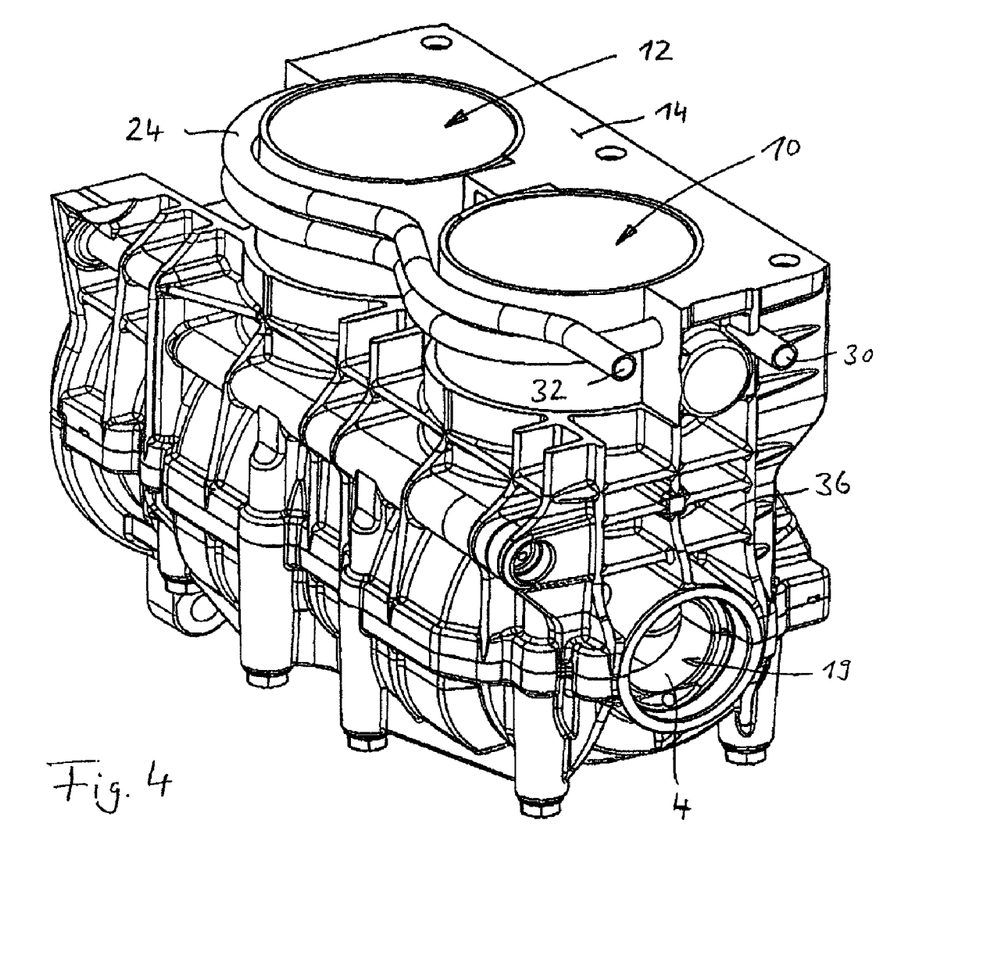
FIG. 4 shows a perspective illustration of a partially cutaway crankcase with an integrated coolant duct as per FIG. 2.
Figure 5:
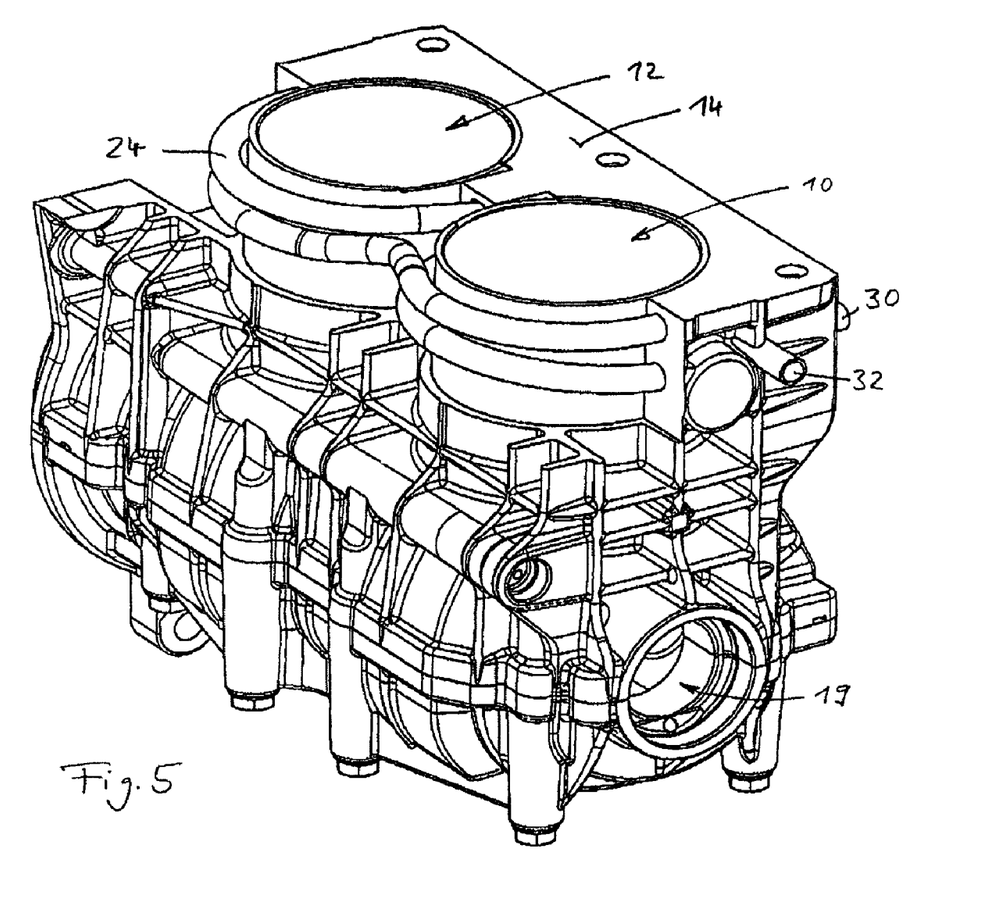
FIG. 5 shows a perspective illustration of a partially cutaway crankcase from FIG. 1 with an integrated coolant duct as per FIG. 3.

In contrast, the tube 24 according to the embodiment of FIG. 3 is bent in such a way that the region 34 between the working cylinders 10, 12 is also supplied with coolant by the tube 24. For this purpose, the tube 24 is likewise bent into a plurality of windings 28 in the shape of a figure eight, with the two ends 30, 32 again opening out into or emerging out of the same end surface 36 of the upper part 8 of the crankcase 1, as shown in FIG. 4 and FIG. 5. In the embodiment of FIG. 4, the tube 24 according to FIG. 2 is integrally cast into the upper part 8 of the crankcase 1, and in the embodiment of FIG. 5, the tube 24 according to FIG. 3 is integrally cast into the upper part 8 of the crankcase 1.

In particular, neither the supply pipe 30 nor the return pipe 32 of the tube 24 open out in the upper contact surface 14 of the upper part 8 of the crankcase 1 with the cylinder cover 17, but rather the supply pipe 30 and return pipe 32 open out at a surface which is not the contact surface 14, preferably in the upper region of one of the side surfaces 36 of the upper part (FIG. 4), or the return pipe 32 opens out at the side surface 36 and the supply pipe 30 opens out at a side surface 38 of the upper part 8 (FIG. 5) or vice versa. It is, of course, also possible for both ends 30, 32 to open out into one of the side surfaces 38 of the upper part 8.

As can also be seen from the partially cut-away illustrations of FIG. 4 and FIG. 5, the tube 24 is integrated entirely into the upper part 8 of the crankcase 1, with merely the ends of the tube 24 as a supply pipe 30 and a return pipe 32 projecting for example a short distance out of the upper part 8 in order to provide a facility for connecting to the coolant circuit which preferably also includes the coolant duct(s) of the cylinder cover 17.

To produce the crankcase 1, therefore, firstly the tube 24 which later forms the coolant duct 16 is shaped according to the desired coolant duct profile, preferably by way of cold or hot working of a steel tube 24. In a further step, the tube 24 is then placed in a casting mold for the upper part 8 of the crankcase 1, in such a way that the tube 24 assumes, in the crankcase 1 to be cast, a position which corresponds to the position of the coolant duct 16 to be formed in relation to the crankcase 1. Finally, the upper part 8 of the crankcase 1 is cast using one of the above-specified methods, with the tube 24 being integrally cast into the crankcase 1, in this case into the upper part 8 thereof, and thereby being held there in a positively locking manner.

Finally, the cylinder cover 17 is mounted and the coolant ducts 16 of the crankcase 1 and of the cylinder cover 17 are connected to one another, either in a series or parallel arrangement.

According to an alternative method for producing the coolant duct 16, the coolant duct 16 could be produced in the conventional way by providing a core during the casting process. To ensure a high level of durability of the coolant duct 16 which is cast from aluminum, the inner peripheral surface of the coolant duct 16 could subsequently be provided with a coating which is resistant to aggressive, high-temperature coolant, for example a coating which contains nickel, carbon, silicone and/or steel. It is also contemplated for the radially inner surface of the cast cooling duct 16 to be surface-treated in order to form, for example, aluminum nitride there.

As already mentioned, a peripherally open oil duct 18 is formed in the contact surface 7 of one of the crankcase parts in the region of the parting plane 2, preferably in the contact surface 7 of the lower part 6 with respect to the upper part 8, which oil duct 18 connects one crankshaft bearing 19 to the other crankshaft bearing 21 for the supply of oil. As the upper part 8 is mounted onto the lower part 6, the peripherally open oil duct 18 is sealingly closed off. The oil duct 18 preferably opens out at the end side of the lower part 6, that is to say at an end surface 40 of the lower part 6 which includes an opening for the crankshaft 5, and forms ports 42, 43 (supply, return) there for an oil supply to the oil duct 18. To produce the oil duct 18, a core is preferably used during the casting process, which core is removed from the lower part 6 again after the casting process.

Figure 7:
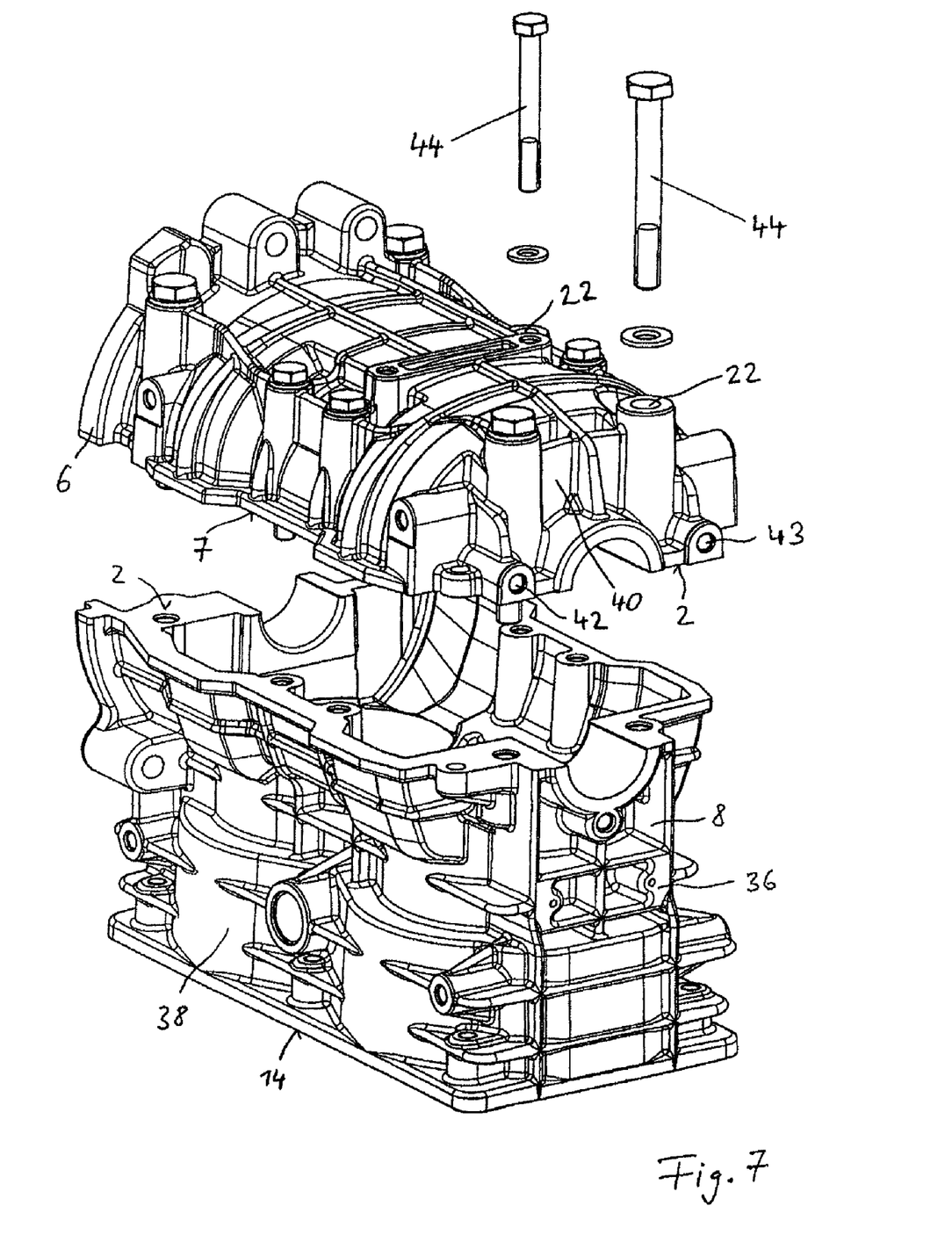
FIG. 7 shows a perspective exploded illustration of the crankcase of FIG. 1 from below.

The upper part 8 and lower part 6 are connected to one another, for example by use of threaded tension rods 44 which extend through passage bores 22 in the lower part 6 and can be screwed into threaded bores in the upper part 8, as can be seen from FIG. 7. The lower part 6 is centered with respect to the upper part 8 for example by way of centering pins (not shown). Sealing between the upper part 8 and the lower part 6 can take place by means of a liquid seal provided in the parting plane 2, for example in the form of sealing substances containing silicone or cyanoacrylate. After the assembly of the upper part 8 and lower part 6, machining of the crankshaft bearings 19, 21 is generally still necessary, into which crankshaft bearings 19, 21 the pre-manufactured plain bearing shells 4 are then inserted.

Accordingly, the upper part 8 is provided with the at least one coolant duct 16 and with the, in each case, one upper part of a crankshaft bearing 19, 21 and has at least one working cylinder 10, 12 which guides a piston 9, 11. In contrast, the lower part 6 has the at least one oil duct 18 for the supply of oil to the crankshaft bearings 19, 21 and the, in each case, lower part of the crankshaft bearings 19, 21.

| Table of Reference Symbols | |
|---|---|
| 1 | Crankcase |
| 2 | Parting plane |
| 3 | Central axis, crankshaft |
| 4 | Plain bearing shell |
| 5 | Crankshaft |
| 6 | Lower part |
| 7 | Contact surface, lower part |
| 8 | Upper part |
| 9 | Piston |
| 10 | Working cylinder |
| 11 | Piston |
| 12 | Working cylinder |
| 13 | Connecting rod |
| 14 | Contact surface |
| 16 | Coolant duct |
| 17 | Cylinder cover |
| 18 | Oil duct |
| 19 | Crankshaft bearing |
| 22 | Passage bores |
| 24 | Tube |
| 26 | Molded regions |
| 28 | Tube windings |
| 30 | End piece |
| 32 | End piece |
| 34 | Region |
| 36 | End surface, upper part |
| 38 | Side surface, upper part |
| 40 | End surface, lower part |
| 42 | Port, oil duct |
| 43 | Port, oil duct |
| 44 | Threaded tension rods |

The invention claimed is:

1. An air compressor of a compressed air system for a vehicle, comprising:
 a crankcase including working cylinders in which are guided pistons of a piston pump;
 a crankshaft operatively arranged in the crankcase, at least one part of the crankcase being a cast aluminum part;
 at least one coolant duct for conducting coolant, the at least one coolant duct comprising at least one tube that is at least partially integrally cast into the crankcase; and
 wherein said at least one tube is operatively configured to have a plurality of windings in a substantially figure eight shape for supplying coolant to a region of the crankcase located between and at least partially surrounding the working cylinders.

2. The air compressor as claimed in claim 1, wherein said at least one coolant duct opens outward at a surface, which is not a contact surface with respect to a cylinder cover, of the crankcase.

3. The air compressor as claimed in claim 2, wherein the surface, which is not the contact surface with respect to the cylinder cover of the crankcase is formed by an end surface oriented substantially perpendicular to the crankshaft.

4. The air compressor as claimed in claim 3, wherein a supply pipe and a return pipe of the at least one coolant duct are formed on the end surface.

5. The air compressor as claimed in claim 1, further comprising:
 a cylinder cover arranged on the crankcase and including a coolant duct for the cylinder cover; and
 a coolant circuit having integrated therein the at least one coolant duct of the crankcase and the coolant duct of the cylinder cover.

6. The air compressor as claimed in claim 1, wherein the at least one tube is formed of a non-aluminum material.

7. The air compressor as claimed in claim 6, wherein the at least one tube is formed at least partially of steel.

8. The air compressor as claimed in claim 1, wherein the crankcase is divided into two crankcase parts at a parting plane, wherein the parting plane encompasses a central axis of the crankshaft.

9. The air compressor as claimed in claim 8, wherein an upper crankcase part is provided with the at least one coolant duct and has the working cylinders.

10. The air compressor as claimed in claim 8, wherein crankshaft bearings are formed on the crankcase and are divided by the parting plane of the crankcase parts.

11. The air compressor as claimed in claim 9, wherein crankshaft bearings are formed on the crankcase and are divided by the parting plane of the crankcase parts.

12. The air compressor as claimed in claim 10, wherein the crankshaft bearings are formed on end surfaces of the crankcase parts.

13. The air compressor as claimed in claim 10, wherein at least one peripherally open oil duct is formed in a contact surface at the parting plane of one of the crankcase parts, wherein the oil duct connects a first of the crankshaft bearings to at least one further crankshaft bearing for the supply of oil.

14. The air compressor as claimed in claim 13, wherein the open oil duct is peripherally closed off by the connection of the two crankcase parts and, on one crankcase part, opens out at an end side into ports for a supply of oil.

15. The air compressor as claimed in claim 8, wherein the two crankcase parts are connected to one another by tension rods.

16. The air compressor as claimed in claim 14, wherein the two crankcase parts are connected to one another by tension rods.

17. A method for producing an air compressor of a compressed air system for a vehicle, the method comprising the steps of:
providing at least one tube to be shaped in accordance with at least one section of a coolant duct of a crankcase of the air compressor;
bending the at least one tube into a plurality of windings substantially in the shape of a figure eight such that coolant is supplied to a region of the crankcase located between and at least partially surrounding working cylinders formed in the crankcase;
placing the at least one shaped tube into a casting for at least one crankcase part of the crankcase, wherein the at least one crankcase part contains the cylinders; and
casting the at least one crankcase part of the crankcase from aluminum such that the at least one shaped tube is at least partially integrally cast into the at least one crankcase part of the crankcase.

18. The method as claimed in claim 17, further comprising the step of producing the crankcase using at least one of a pressure die casting, permanent mold casting, and sand casting, process.

19. The method as claimed in claim 18, wherein the at least one tube is formed of steel and is shaped to the figure eight configuration via one of cold and hot working of the steel tube.

20. The method as claimed in claim 17, wherein the at least one tube is produced from a non-aluminum material.

* * * * *